Sept. 28, 1965  R. J. LIDGARD  3,208,470
INSULATION FOR A CRYOGENIC VALVE
Filed Feb. 28, 1963
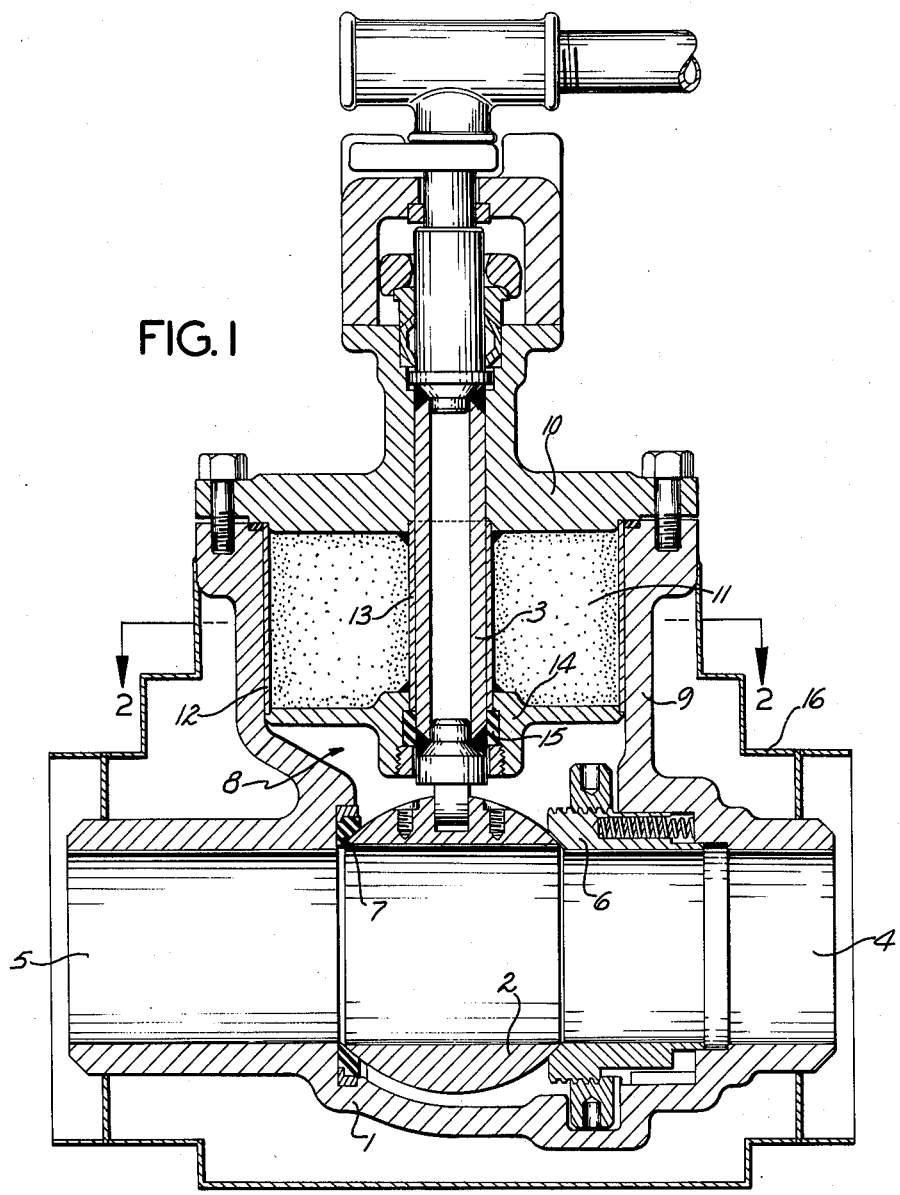
FIG. I
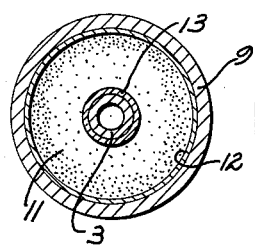
FIG. 2
INVENTOR.
ROBERT J. LIDGARD
BY
ATTORNEY

United States Patent Office 3,208,470
Patented Sept. 28, 1965

3,208,470
INSULATION FOR A CRYOGENIC VALVE
Robert J. Lidgard, Long Beach, Calif., assignor to Pacific Valves, Inc., Long Beach, Calif., a corporation of California
Filed Feb. 28, 1963, Ser. No. 261,737
5 Claims. (Cl. 137—375)

This invention relates to insulation for a cryogenic valve, for the purpose of reducing heat transfer through the valve to the cryogenic fluid which is carried through the pipe line in which the valve is placed. My invention is preferably applied to a ball or globe type valve, where the ball or globe can be removed from the body of the valve through an appropriately sized opening in the top of the valve body in order to repair the same. This is a so-called top entry valve.

An object of my invention is to provide a novel means of insulating the area between the cap or cover of the valve and the ball or globe of that valve, so that heat will not be readily transferred through this area and thence to the cryogenic fluid carried by the valve.

Another object of my invention is to provide a novel insulation for a cryogenic valve, which consists of an inclosure secured to the bonnet or cap of the valve, and which is welded to this bonnet so that the inclosure can be removed with the bonnet when the valve is disassembled; and also the inclosure extends downwardly into an extended or neck portion of the valve body to a point adjacent the upper surface of the ball or globe.

Another object of my invention is to provide a novel insulation for a cryogenic valve in which the welded inclosure of the insulation can be purged with an inert gas, preferably nitrogen, although helium may also be used if desired.

Another object of my invention is to provide a novel insulation for a cryogenic valve which occupies the greater part of the area between the bonnet and the ball or globe valve, thus providing a small area or chamber into which the cryogenic fluid will seep and will be there vaporized, due to the limited amount of heat transfer through the bonnet and valve stem, and the gas in this chamber will confine the level of the cryogenic fluid to the body cavity below the inclosure containing the inert gas.

Still another object of my invention is to provide a novel jacketed top entry valve in which the valve can be entered for repair purposes without destroying the insulating jacket.

Other objects, advantages and features of invention may appear from the accompanying drawing, the subjoined detailed description and the appended claims.

In the drawing:
FIGURE 1 is a vertical sectional view of my jacketed top entry valve.
FIGURE 2 is a sectional view on a reduced scale taken on line 2—2 of FIGURE 1.

Referring more particularly to the drawing, the numeral 1 indicates the body of a valve in which a ball or globe 2 is rotatably mounted. The ball 2 is rotated by means of a stem 3 in the usual and well known manner of this type of valve, that is, the stem 3 is rotated by means of a handle, wheel, or the like. The body 1 of the valve is provided with the usual intake passage 4 and outlet passage 5, between which the ball 2 is mounted as shown. The ball is rotated about its vertical axis to various positions as might be required. To seal the ball on the upstream side I provide a seat 6, and on the down side a sealing seat 7, both of which engage the ball or globe 2 to provide an effective seal. Either or both of these seats may consist of an elongated sleeve, as here shown for the seat 6, which can be retracted in any one of a number of ways to withdraw this seat and permit the ball 2 to be pulled upwardly out of the body 1 when it is necessary to repair the ball 2 or the seats 6 and 7. The ball 2 is positioned in alignment with the passages 4 and 5, and also within an aperture 8 which is formed within the body 1. The aperture 8 is defined by vertical walls 9 which are part of the body 1 of the valve, and these walls form an extension to receive the insulating chamber or can, which will be further described. A bonnet or cap 10 is bolted or otherwise secured to the top of the body 1, and preferably to the top surface of the wall 9.

The can or chamber 11 is annular in shape and is defined by an outer annular ring 12 which closely fits the inner surface of the wall 9. The ring 12 is welded at its upper edge to the lower surface of the bonnet 10. An inner sleeve 13 closely fits the stem 3, and this sleeve is also welded to the bottom surface of the bonnet 10. A bottom wall 14 consists of the bottom inclosure of the chamber 11, and this wall is provided with a suitable bearing or guide ring 15 to center and guide the stem 3. The outer ring 12 and the inner sleeve 13 are both welded to the bottom wall 14, thus completing the chamber 11 and providing an inclosure and sealed annular chamber which is arranged below the bonnet 10 and surrounds the stem 3 and extends into the aperture 8 to adjacent the ball 2. When the chamber 11 is purged with an inert gas, such as nitrogen, this gas, when lowered to the approximate temperature of the cryogenic fluid, will condense, creating a partial vacuum in the chamber 11 and further insulating this area below the bonnet 10. Since the chamber 11 is substantially an integral or fixedly attached part of the bonnet 10 and the wall 14, this chamber will be removed with the bonnet when it is necessary to work on the ball 2. Therefore, it is not necessary to disturb this insulation chamber, nor will it be necessary to disturb or injure the jacket 16 which surrounds the valve body 1.

The close fit of the ring 12 with the wall 9 of the body 1, and also the close fit of the sleeve 13 around the stem 3, will provide very small areas above the ball 2. These small areas will fill with liquid from the cryogenic material within the valve, and this liquid will vaporize due to the same amount of heat influx through the bonnet 10 and the wall 9. Also there is a small amount of heat which flows down the stem 3. The vapor or gas thus formed within the aperture 8 will create a pressure to limit the level of the cryogenic fluid to an area approximately within the ball 2, or at the most an area immediately above the top surface of the ball.

Once the chamber 11 has been purged with an appropriate gas, such as helium or nitrogen, this chamber need not be subsequently purged again, since it is entirely sealed before it is fitted into the valve body as described. Even though the chamber 11 may be subsequently removed and replaced a number of times, it still would remain effectively purged with a gas, and its insulating properties would remain adequate.

Having described my invention, I claim:
1. An insulation for a ball type valve including a body, a ball rotatably mounted in said body,
said body having an intake and an outlet port therein, both of said ports extending to the ball;
said body having an aperture therein in which the ball is mounted,
an outwardly extending wall defining said aperture,
a bonnet detachably secured to the wall and closing one end of the aperture,
a valve stem extending through the bonnet and connected to the ball to rotate the same,
a chamber means in said aperture, said chamber surrounding the stem directly and positioned below the bonnet, said chamber means being defined by an outer ring and an inner sleeve and a bottom wall, said ring and sleeve being attached at one end to the bonnet and at the other ends to the bottom wall.

2. An insulation for a ball type valve including a body, a ball rotatably mounted in said body, said body having an intake and an outlet port therein, both of said ports extending to the ball;

said body having an aperture therein in which the ball is mounted, an outwardly extending wall defining said aperture, a bonnet detachably secured to the wall and closing one end of the aperture, a valve stem extending through the bonnet and connected to the ball to rotate the same, a chamber means in said aperture, said chamber surrounding the stem directly and positioned below the bonnet, said chamber means being defined by an outer ring and an inner sleeve and a bottom wall, said ring and sleeve being attached at one end to the bonnet and at the other ends to the bottom wall, said chamber means closely fitting said wall and said stem.

3. An insulation for a ball type valve including a body, a ball rotatably mounted in said body, said body having an intake and an outlet port therein, both of said ports extending to the ball;

said body having an aperture therein in which the ball is mounted, an outwardly extending wall defining said aperture, a bonnet detachably secured to the wall and closing one end of the aperture, a valve stem extending through the bonnet and connected to the ball to rotate the same, a hermetically sealed chamber means in said aperture, said chamber surrounding the stem directly and positioned below the bonnet, said chamber means being purged before sealing with an inert gas.

4. An insulation for a ball type valve including a body, a ball rotatably mounted in said body, said body having an intake and an outlet port therein, both of said ports extending to the ball;

said body having an aperture therein in which the ball is mounted, an outwardly extending wall defining said aperture, a bonnet detachably secured to the wall and closing one end of the aperture, a valve stem extending through the bonnet and connected to the ball to rotate the same, a hermetically sealed chamber means in said aperture, said chamber surrounding the stem directly and positioned below the bonnet, said chamber means being purged before sealing with an inert gas, said chamber means being defined by an outer ring and an inner sleeve and a bottom wall, said ring and sleeve being welded at one end to the bonnet and at the other ends to the bottom wall to hermetically seal said chamber means.

5. An insulation for a ball type valve including a body, a ball rotatably mounted in said body, said body having an intake and an outlet port therein, both of said ports extending to the ball;

said body having an aperture therein in which the ball is mounted, an outwardly extending wall defining said aperture, a bonnet detachably secured to the wall and closing one end of the aperture, a valve stem extending through the bonnet and connected to the ball to rotate the same, a chamber means in said aperture, said chamber surrounding the stem directly and positioned below the bonnet, said chamber means being defined by an outer ring and an inner sleeve and a bottom wall, said ring and sleeve being attached at one end to the bonnet and at the other ends to the bottom wall, there being a space within the aperture between said ball and the bottom of the chamber means.

References Cited by the Examiner

UNITED STATES PATENTS

| 1,108,840 | 8/14  | Franke     | 137—375 X |
| 2,524,009 | 9/50  | Dopp et al.| 137—375   |
| 2,837,308 | 6/58  | Shand      | 251—315 X |
| 2,954,797 | 10/60 | Dryer      | 137—375   |
| 3,111,136 | 11/63 | Persidsky  | 251—315 X |

M. CARY NELSON, *Primary Examiner.*